May 31, 1955   H. F. VICKERS   2,709,495
POWER STEERING SYSTEM WITH HYDRAULIC BOOSTER MOTOR
Filed Aug. 16, 1952   2 Sheets-Sheet 1

*INVENTOR.*
HARRY F. VICKERS
BY
Ralph L. Tweedale
ATTORNEY

May 31, 1955  H. F. VICKERS  2,709,495
POWER STEERING SYSTEM WITH HYDRAULIC BOOSTER MOTOR
Filed Aug. 16, 1952  2 Sheets-Sheet 2

INVENTOR.
HARRY F. VICKERS
BY
*Ralph L. Tweedale*
ATTORNEY

United States Patent Office 2,709,495
Patented May 31, 1955

2,709,495

POWER STEERING SYSTEM WITH HYDRAULIC BOOSTER MOTOR

Harry F. Vickers, Detroit, Mich., assignor to Vickers Incorporated, Detroit, Mich., a corporation of Michigan Application August 16, 1952, Serial No. 304,826

7 Claims. (Cl. 180—79.2)

This invention relates to power transmissions, and is particularly applicable to those of the type comprising two or more fluid pressure energy translating devices, one of which may function as a pump and another as a fluid motor.

The invention is generally concerned with power steering for the dirigible wheels of a motor vehicle. Power steering has been in wide use on commercial vehicles for a number of years but has only recently begun to invade the passenger car field. As might be expected, most of the present passenger car installations are more or less extensive modifications of the prior commercial vehicle devices. This evolutionary development has resulted in the retention of characteristics which, while not highly objectionable in commercial vehicles, are quite undesirable in units for passenger car use.

One of the undesirable features of the conventional booster units is the complexity of making the initial installation. This results in both loss of time at assembly and in added cost of the vehicle. In the high speed assembly lines of passenger car production and in the highly competitive field of their sales these results are most unwelcome. Complex installation is also usually accompanied by difficult maintenance problems should repairs be necessary. This is especially true in view of the growing practice of removing and exchanging units in event of failure, and returning the faulty unit to a base repair shop.

Another objectional characteristic retained by most conventional boosters is the location of the power unit on or in close proximity to the steering column. Thus any noise generated by the unit is transmitted directly to the passenger compartment through the steering column.

It is an object of this invention to provide a compact, rugged, and low cost steering booster power unit.

It is a further object to provide such a unit positioned remote from the vehicle steering column thus isolating any noise it produces from the passenger compartment.

Another object is to provide a unitary assembly of power mechanism and control valve mechanism providing ease of installation and removal.

It is also an object to provide such a unit which, when secured to the vehicle frame, provides a junction for the tie rods and the drag link.

It is still another object of this invention to provide such a unit, the mere mounting of which effects all necessary fluid connections.

Further objects and advantages of the present invention will be apparent from the following description, reference being had to the accompanying drawings wherein a preferred form of the present invention is clearly shown.

Figure 1:
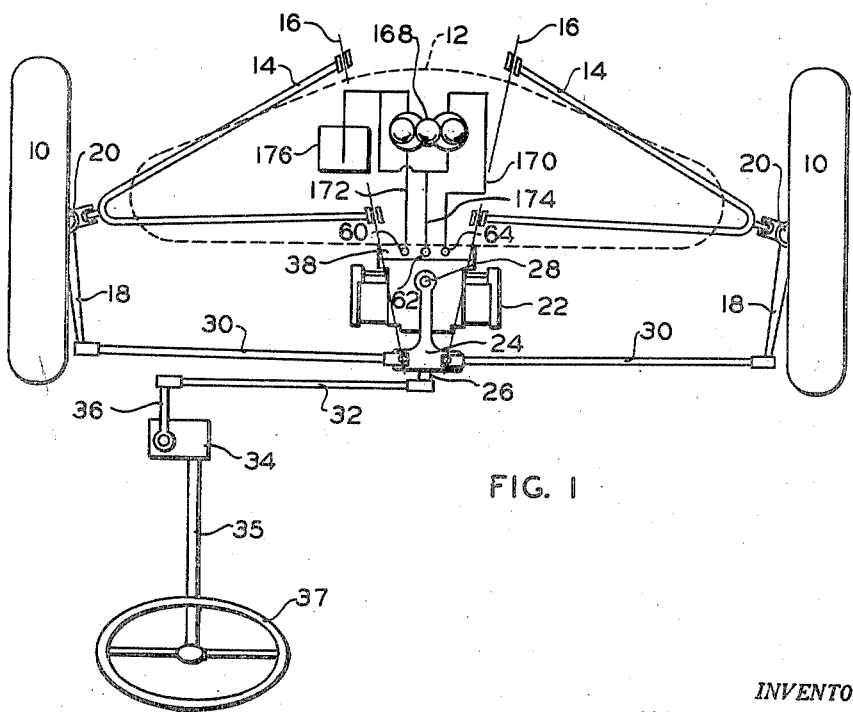
Figure 1 is a schematic diagram of the present invention as incorporated in a vehicle having independent front wheel suspension.
Figure 2:
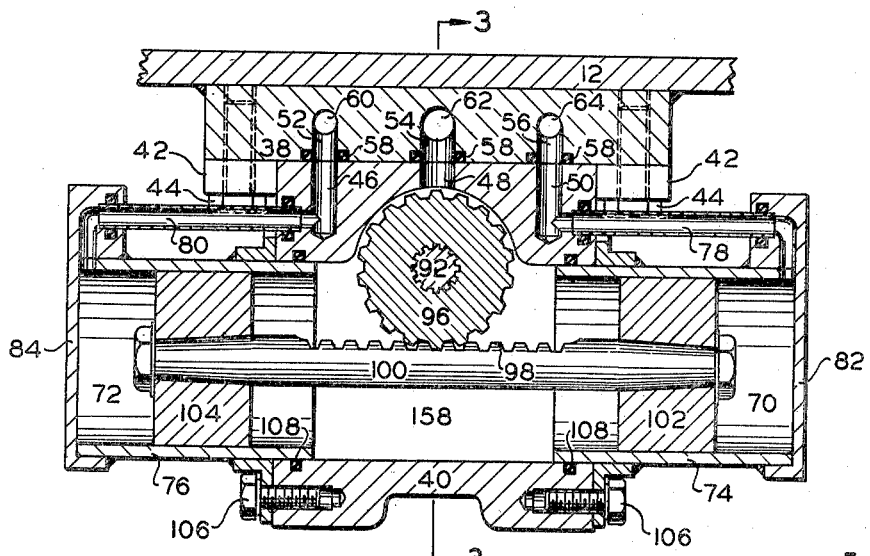
Figure 2 is a section taken on line 2—2 of Figure 3 showing a preferred form of the power unit illustrated in Figure 1.

Referring now to Figure 1, there are shown the independently sprung dirigible wheels 10 of a motor vehicle whose front cross frame member is indicated by the dotted outline 12. Wheels 10 are supported by the wishbone links 14 which are pivotally connected to the vehicle frame on the axes 16. The usual knuckle arms 18 are provided for turning the wheels about the knuckle axes 20 to steer the vehicle. The booster unit 22 is secured to the frame cross member 12 and includes a tie rod junction plate 24 and a drag link connection arm 26 both pivoted on the unit about an axis at 28. Tie rods 30 connect each of the knuckle arms 18 to the tie rod junction plate 24 and a drag link 32 leads from the steering gear 34 and pitman arm 36 to the arm 26. A steering column 35 extends from gear 34 to a driver controlled wheel 37. It should be noted that the point where each tie rod 30 connects to the junction plate 24 lies on the axis 16 of the wishbone supporting its respective wheel 10. Such an arrangement leaves the steering unaffected by spring action.

Mounting and dismounting of the booster unit is greatly facilitated by the provision of a sub plate 38 which is welded or otherwise suitably secured to the vehicle frame 12. The central portion 40 of the booster unit housing has mounting ears 42 thereon through which the mounting bolts 44 extend into tapped holes in the sub plate 38. All necessary hydraulic connections are effected by the mere mounting of the booster unit 22 on sub plate 38 since passages 46, 48, and 50 in the booster housing are coincident with the passages 52, 54, and 56 in the sub plate 38 at the juncture between the housing and sub plate. O-ring seals 58 insure against leakage from the passages at their junction. Passages 52, 54, and 56 are intersected respectively by passages 60, 62, and 64 which extend to the upper face 66 of the sub plate 38 where each is provided with a threaded connection port as shown at 68 in Figure 3. Passages 46 and 50 are connected respectively to the opposing head ends 70 and 72 of a pair of cylinders 74 and 76 by tubes 78 and 80 extending between the central portion 40 and the cylinder end caps 82 and 84. Passage 48 leads from the interior of the housing portion 40.

Figure 3:
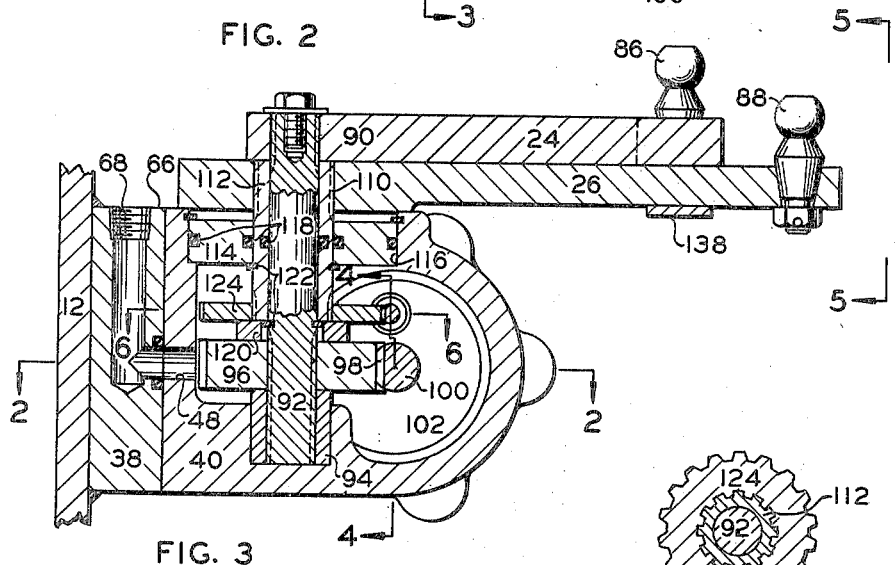
Figure 3 is a section taken on line 3—3 of Figure 2.
Figure 6:
Figure 6 is a view on line 6—6 of Figure 3.
Figure 5:
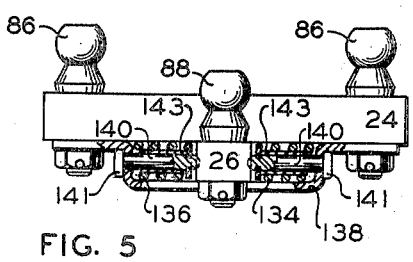
Figure 5 is a view on line 5—5 of Figure 3.

As can best be seen in Figure 3 and Figure 5, junction plate 24 is provided with ball studs 86 for the connection of tie rods 30 and arm 26 has a ball stud 88 for connection of drag link 32. Plate 24 and arm 26 are concentrically pivoted in the central portion 40 of the booster unit 22.

Plate 24 is spline connected at 90 to a shaft 92 journalled in a bushing 94. Shaft 92 is splined at its inner end to a gear 96 which meshes with a rack 98 carried by a connecting rod 100. Rod 100 extends between a pair of opposed pistons 102 and 104 which are secured to its ends and are conjointly slidable in the cylinders 74 and 76. Cylinders 74 and 76 are secured to the central body portion 40 by a plurality of bolts 106 and sealed by a pair of O-ring seals 108. It can be seen that a positively acting linkage system interconnecting pistons 102 and 104 and the dirigible wheels 10 has thus been established.

Arm 26 is spline connected at 110 to a tubular shaft 112 which carries a male spline at each end and snugly encircles the shaft 92. A plug 114 serves as a closure in the housing bore 116 and also as a journal for the shaft 112. O-ring seals 118 insure against leakage of fluid from the housing. A spacer 120 and the snap rings 122 insure retention and proper positioning of the shafts 92 and 112 and the gears 96 and a gear 124.

Shaft 112 is splined at its inner end to the gear 124 which has the same pitch diameter as gear 96 and engages a rack 126 on a valve operating rod 128. Valve operating rod 128 extends between a pair of valves 130 and 132 carried by pistons 102 and 104. Valves 130 and 132 act to control pressure operation of the pistons 102 and 104 in a manner hereinafter described. It can be seen that a positively acting linkage system is thus established between the steering gear 34 and the valves 130 and 132.

A pair of opposed springs 134 and 136 act against the sides of a U-shaped bracket 138 secured to the junction plate 24 to bias a pair of stop pins 140 inwardly, toward the arm 26, to a position where their heads 141 abut the bracket. The inner ends of pins 140 contact arm 26 to establish the spring centered position in which arm 26 and plate 24 are illustrated. A sleeve 143 on each of the pins 140 limits the lost motion between plate 24 and arm 26 by limiting the outward movement of pins 140.

Figure 4:
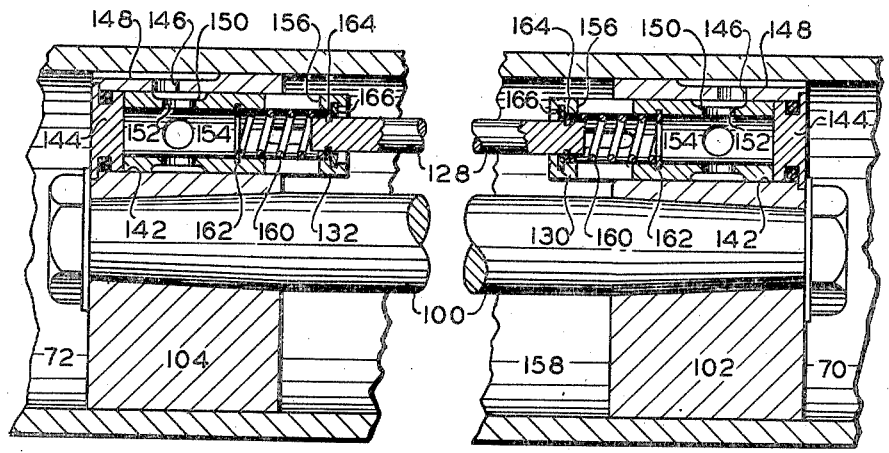
Figure 4 is an enlarged partial section taken on line 4—4 of Figure 3.

Referring now to Figure 4, each piston 102 and 104 has a valve bore 142 therein which is closed and sealed at its outward end by a plug 144. Each of the valve bores 142 is fluid connected to the cylinder head end 70 or 72 associated with its respective piston 102 or 104 by a radial passage 146 and an axial groove 148 in that piston. Each of the valves 130 and 132 is of tubular construction and has an annular groove 150 connected by radial passages 152 to the interior 154 of the valve. Another set of radial passages 156 effects fluid communication between the valve interior and the central interior portion 158 of the booster unit. A spring 160 acting between a snap ring 162 in the valves and another, 164, on the rod 128, biases each valve outward toward a limiting position established by abutment of the snap rings 166 and 164. The abutment of snap rings 164 and 166 enables rod 128 to exert a positive pull on either of the valves 130 or 132 and the resilient coupling furnished by springs 160 permits the rod 128 to be pushed toward either valve even when that valve abuts the bore closure plug 144. As illustrated, the valves 130 and 132 are normally open, that is, the head ends 70 and 72 communicate with case interior 158, but are shiftable through the rod 128 to isolate either of those ends from the case interior.

Since gears 96 and 124 are concentrically mounted and have the same pitch diameter, their conjoint rotation will produce identical movement of operating rod 128 and connecting rod 100, thus leaving uneffected the relative position of valves 130 and 132 and pistons 102 and 104. It follows that relative movement between arm 26 and plate 24 will cause shifting of rod 128 with respect to rod 100, and of one of the valves 130 or 132 relative to its respective piston 102 or 104. As heretofore mentioned, relative movement between arms 26 and plate 24 is resisted by the biasing force of springs 134 and 136 and limited by the sleeves 143 on stop pins 140.

The pumping unit indicated schematically at 168 in Figure 1 may be of the multiple gear type described in the patent to George P. Bentley et al., No. 2,432,502. Pump 168 would normally be in a driving relation with the engine, not shown, of the vehicle and provides two independent sources of supply of pressure fluid. Each of these sources connects to one of the passages 60 and 64 through conduits 170 and 172. The conduit 174 extends between passage 62 and a fluid reservoir 176.

In operation, a steering movement applied to the wheel is transmitted through gear 34, pitman arm 36 and drag link 32 to the arm 26. If resistance of wheels 10 to turning is not large, the centering force of springs 134 and 136 may not be overcome and steering will be entirely manual through the springs 134 and 136, plate 24, and the tie rods 30.

Should wheels 10 substantially resist turning, the centering force of springs 134 and 136 will be overcome and arm 26 will pivot relative to plate 24, thus shifting one of the valves 130 or 132 as heretofore described. With valves 130 and 132 in the neutral position illustrated, the fluid supplied to the head ends 70 and 72 by multiple pump 168 will be ported to the tank 176 through a path which includes grooves 148, radial passages 146, annular grooves 150, radial passages 152, the valve interior 158 and passage 48. Shifting of one of the valves 130 or 132 is effective to restrict or completely block flow from its respective head end 70 or 72, causing a build up of pressure in that end which acts on the piston therein thus producing steering force.

For example, assume it is desired to cause the vehicle to turn to the right as viewed in Figure 1. Wheel 37 would be turned to the right causing pitman arm 36 to move drag link 32 to the left. On overcoming the centering force of springs 134 and 136, lost motion between arm 26 and plate 24 results in arm 26 rotating clockwise relative to plate 24. Gear 124 then shifts operating rod 128 and hence valve 130 to the left as viewed in Figure 4, causing pressure to build up in head end 70 and shifting piston 102 and rod 100 to the left. Shifting of rod 100 drives gear 96 and hence plate 24 in a clockwise direction thus effecting power steering and a follow up action which restores valve 130 to the neutral position. Operation is analogous in turning the vehicle to the left.

It should be noted that installation and removal of the booster unit is easily accomplished. For example, to remove the unit it is only necessary that the bolts 44 be removed and the ball socket joints between the unit and the tie rods and drag link be disconnected.

Further, it can be seen that the present invention provides a compact unitary structure including power pistons and operating valve and having a minimum of external fluid connection ports.

It should also be noted that the booster unit is positioned remote from the vehicle steering column, thus isolating noises connected therewith from the passenger compartment.

While the form of embodiment of the invention as herein disclosed constitutes a preferred form, it is to be understood that other forms might be adopted, all coming within the scope of the claims which follow.

What is claimed is as follows:

1. In a vehicle steering system having a pair of dirigible wheels with a tie rod leading to each and having a steering gear operably connected to a drag link: a source of fluid pressure; a steering booster power unit having a housing secured to the vehicle frame and fluid pressure shiftable piston means in the housing; a tie rod junction member mounted pivotally on the housing in driving relation with the piston means and having an end of each tie rod secured thereto; means forming a lost motion connection between the drag link and the junction member; and valve means responsive to lost motion between the drag link and junction member to control the flow of fluid pressure to the power unit and thus effect movement of the piston means.

2. In a vehicle steering system having a pair of dirigible wheels with a tie rod leading to each and having a steering gear operably connected to a drag link: a source of fluid pressure; a steering booster power unit having a housing secured to the vehicle frame and fluid pressure shiftable piston means in the housing; a tie rod junction member mounted pivotally on the housing in driving relation with the piston means and having an end of each tie rod secured thereto; means forming a lost motion connection between the drag link and the junction member, said means including an arm connected to the drag link and mounted pivotally concentric with the junction member and being capable of limited angular movement relative to the junction member; and valve means responsive to said angular movement to control the flow of fluid pressure to the power unit and thus effect movement of the piston means.

3. In a vehicle steering system having a pair of dirigible wheels with a tie rod leading to each and having a steering gear operably connected to a drag link: a source of fluid pressure; a steering booster power unit having a housing secured to the vehicle frame and fluid pressure shiftable piston means in the housing; valve means inside the housing shiftable to control the flow of pressure fluid and thus effect movement of the piston means; a pair of concentric shafts mounted on the housing capable of limited relative rotation, the first being in a driving relation with said piston means and the second in a driving relation with said valve means; a tie rod junction member secured to said first shaft and having an end of each tie rod connected thereto; and an arm connected to the drag link and secured to said second shaft whereby relative rotation of said shafts will cause shifting of said valve.

4. In a vehicle steering system having a pair of dirigible wheels with a tie rod leading to each and having a steering gear operably connected to a drag link: a source of fluid pressure; a steering booster power unit having a housing secured to the vehicle frame and fluid pressure shiftable piston means in the housing; valve means carried by said piston means shiftable to control the flow of pressure fluid and thus effect movement of the piston means; a pair of concentric shafts mounted on the housing capable of limited relative rotation, the first being in a driving relation with said piston means and the second in a driving relation with said valve means; a tie rod junction member secured to said first shaft and having an end of each tie rod connected thereto; and an arm connected to the drag link and secured to said second shaft, whereby relative rotation of said shafts will cause shifting of said valve, and shifting of said piston means will restore the valve thus producing follow-up action.

5. In a vehicle steering system having a pair of dirigible wheels with a tie rod leading to each: a steering member; a tie rod junction member to which one end of each tie rod is connected; means including a first rotatable shaft for pivotally supporting the junction member; a power operated servomotor in driving relation with said shaft whereby power steering can be effected; valve means controlling operation of said servomotor and having first and second relatively movable parts, said first part being movable with said servomotor to terminate power steering; a second shaft rotatable relative to said first shaft and concentric therewith in driving relation with the second part of said valve means; and linkage means connecting the steering member and said second shaft to initiate power steering.

6. For use in a vehicle steering system having a pair of dirigible wheels with a tie rod leading to each and having a steering gear operably connected to a drag link, a unitary assembly of a power operated steering booster comprising: a housing having provisions for mounting on the vehicle frame; a power operated servomotor in said housing; a tie rod junction member pivoted on said housing in driving relation with said servomotor; a drag link connection arm in a force transmitting relation with said junction member; a lost motion driving connection between said connection arm and said junction member; and means responsive to relative motion between said connection arm and said junction member to actuate said servomotor.

7. In a vehicle steering system having a pair of dirigible wheels with a tie rod leading to each: a steering member; a tie rod junction member to which one end of each tie rod is connected; means including a first rotatable shaft for pivotally supporting the junction member; a power operated servomotor in driving relation with said shaft whereby power steering can be effected; a second shaft rotatable relative to said first shaft and concentric therewith; valve means controlling operation of said servomotor, said valve having a member movable by actuation of said second shaft, and being associated with said motor in a follow up relation; and linkage means connecting the steering member and said second shaft to initiate power steering.

References Cited in the file of this patent

UNITED STATES PATENTS

| | | |
|---|---|---|
| 1,872,714 | Farley | Aug. 23, 1932 |
| 1,875,226 | Dewandre | Aug. 30, 1932 |
| 2,053,272 | Eaton | Sept. 8, 1936 |
| 2,219,645 | Bartho et al. | Oct. 29, 1940 |
| 2,426,938 | Langley | Sept. 2, 1947 |
| 2,427,340 | Allison | Sept. 16, 1947 |
| 2,429,185 | Hukill | Oct. 14, 1947 |

FOREIGN PATENTS

| | | |
|---|---|---|
| 335,539 | Great Britain | Sept. 24, 1930 |
| 347,212 | Great Britain | Apr. 20, 1931 |
| 758,143 | France | Jan. 11, 1935 |